United States Patent [19]

Evans et al.

[11] 4,447,867

[45] May 8, 1984

[54] MULTIPHASE INVERTER DRIVE CIRCUIT WITH SYNCHRONIZED SWITCHING DELAY FEATURE

[75] Inventors: William E. Evans; Jimmie D. Gillett, both of Garland, Tex.

[73] Assignee: Varo, Inc., Garland, Tex.

[21] Appl. No.: 343,748

[22] Filed: Jan. 29, 1982

[51] Int. Cl.³ .............................................. H02M 7/217
[52] U.S. Cl. ....................................... 363/56; 363/49; 363/132
[58] Field of Search ........................ 363/49, 43, 56, 98, 363/132, 134; 318/801-803

[56] References Cited

U.S. PATENT DOCUMENTS

| 4,051,418 | 9/1977 | Berto et al. | 363/56 |
|---|---|---|---|
| 4,126,819 | 11/1978 | Stobbe et al. | 363/56 |
| 4,213,103 | 7/1980 | Birt | 363/98 |

FOREIGN PATENT DOCUMENTS 54-139025 10/1979 Japan .................................. 363/132

OTHER PUBLICATIONS

Technical Proposal for Gas Centrifuge Enrichment Plant Prototype Machine Drive Package (MDP), Dec. 20, 1979.

Primary Examiner—William H. Beha, Jr.
Attorney, Agent, or Firm—Jerry W. Mills; Gregory M. Howison; Nina Medlock

[57] ABSTRACT

A synchronized switching delay circuit including an oscillator and multivibrator for generating a synchronized delay pulse. The oscillator is divided into three waveforms shifted in phase by 120°. A 4-16 decoder receives the three waveforms and the delay pulse outputs a series of blanking pulses that blank a portion of the leading edge of each of the pulses in each of the three waveforms and their complements to provide a leading edge delay. The resulting delayed waveforms are input to a three phase bridge circuit comprised of three pairs of complementary switches. The delay enables one of the switches in each pair to completely turn off before the other switch turns on.

13 Claims, 6 Drawing Figures

MULTIPHASE INVERTER DRIVE CIRCUIT WITH SYNCHRONIZED SWITCHING DELAY FEATURE

TECHNICAL FIELD

The present invention pertains to synchronized switching delays and more particularly to a synchronized switching delay for controlling switches in the switching regulator of a DC to AC converter.

BACKGROUND OF THE INVENTION

Three phase switching regulators that utilize DC to AC conversion require a three phase bridge circuit. Conventional bridge circuits consist of three pairs of complementary switches utilizing either transistors or SCRs as the switching element. Each complementary pair alternately switches a positive and negative DC voltage to one of three respective output terminals. Each of the three complementary pairs are controlled respectively by three square waves that are 60° out of phase. The output terminals for each of the complementary pairs are connected such that the bridge generates a pseudo square wave. The operation of a three phase bridge circuit is described more fully in co-pending U.S. application Ser. No. 345,699.

When transistors are utilized as switching elements, practical limitations of the devices must be considered. The transistors in each complementary pair are driven by a square wave such that each switch is 180° out of phase with its complement. Typically, a transistor can be turned on faster than it can be turned off. This is due to the storage time within the device itself. If the transistor is not allowed to completely turn off prior to turning on the remaining transistor in the pair, then a momentary short is impressed across the positive and negative DC terminals. This allows a high current to pass through both transistors in the pair which is normally termed "shoot-through" current. This shoot-through current increases the transistor failure rate in addition to causing perturbations in the output waveform.

To prevent shoot-through current, systems have been developed that inject a delay in the system to prevent a transistor from turning on before its complement turns off. This delay is adjusted such that the transistor that is turning off is allowed sufficient time for its conduction storage to be swept out. Typically, in the type of transistors utilized, three to five microseconds of storage time is present.

One type of delay circuit that has been implemented utilizes an accurate delay circuit. This type of circuit monitors each individual transistor to ensure that the transistor is off prior to turning on its complement. As soon as the transistor has turned off, the complement is turned on. The disadvantage to this type of circuit is that asymmetry will be present in the output waveforms. Depending on the characteristics of the transistors, it is possible to have one delay in one complementary pair of transistor switching elements and a second and different delay in a corresponding pair. When driving a motor with the three phase output waveform, the asymmetrical delays can result in DC current input to the motor and undesirable harmonics.

In view of the above problems, it is desirable to have a three phase bridge circuit with a uniform delay between the turning off and the turning on of two transistors in a complementary pair such that a symmetrical waveform is output.

SUMMARY OF THE INVENTION

The present invention comprises a circuit for leading edge delay in pulse waveforms. A circuit is provided for generating a plurality of synchronized reference pulse waveforms. A delay pulse is also provided that is synchronized with the reference waveforms and has a variable width. A steering circuit receives the reference waveforms and the delay pulse and generates a plurality of blanking pulse waveforms with each pulse therein having a width equal to the width of the delay pulse. The leading edge of each of the blanking pulses corresponds to the leading edge of each of the reference waveforms. A blanking circuit receives the reference and the blanking waveforms and outputs a plurality of delayed pulse waveforms. Each of the delayed waveforms corresponds directly with one of the reference waveforms with the leading edge delayed by the width of the delay pulse. Adjustment of the delay pulse simultaneously adjusts the leading edge delay in each of the delayed waveforms.

In accordance with another aspect of the present invention, the reference pulse waveforms comprise a first waveform at 0° phase shift, a second waveform at 120° phase shift, a third waveform at 240° phase shift and the complements thereof. The resulting delayed waveforms drive three pairs of complementary switches such that one switch in the complementary pair is off when the remaining switch is on. The delay pulse allows sufficient time for a switch to turn off before the complement thereof turns on. The switches drive a three phase DC to DC converter for a switching regulator.

BRIEF DESCRIPTION OF THE DRAWINGS

For a more complete understanding of the present invention and the advantages thereof, reference is now made to the following description, taken in conjunction with the accompanying drawings in which.

DETAILED DESCRIPTION OF THE INVENTION

Figure 1:
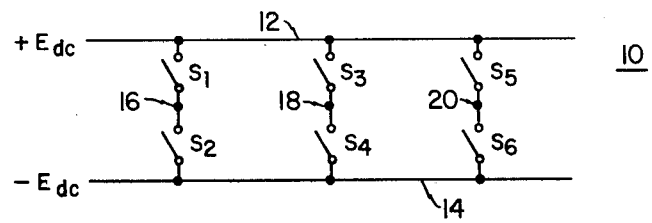
FIG. 1 is a schematic representation of a three phase bridge circuit having three complementary pairs of switching elements.

Referring to FIG. 1, there is shown a schematic representation of a three phase bridge circuit 10 for converting Direct Current (DC) to Alternating Current (AC). A power terminal 12 has a positive DC voltage $+E_{DC}$ applied to it and a power terminal 14 has a negative voltage $-E_{DC}$ applied to it. A single pole single throw switch $S_1$ has one end thereof connected to the power terminal 12 and the other end thereof connected to an output terminal 16. A single pole single throw switch $S_2$ has one end thereof connected to the power terminal 14 and the other end thereof connected to the output terminal 16. A single pole single throw switch $S_3$ has one end thereof connected to the power terminal 12 and the other end thereof connected to an output terminal 18. A single pole single throw switch $S_4$ has one end thereof connected to the power terminal 14 and the other end thereof connected to the output terminal 18. A single pole single throw switch $S_5$ has one end thereof connected to the power terminal 12 and the other end thereof connected to an output terminal 20. A single pole, single throw switch $S_6$ has one end thereof connected to the power terminal 14 and the other end thereof connected to the output terminal 20. The switches $S_1$ and $S_2$, the switches $S_3$ and $S_4$ and the switches $S_5$ and $S_6$ comprise three complementary pairs of switches respectively. Each complementary pair alternately switches the $+E_{DC}$ and the $-E_{DC}$ to the respective output terminals 16, 18 and 20. The switches $S_1$–$S_6$ can be either transistors or SCR's.

Figure 2:
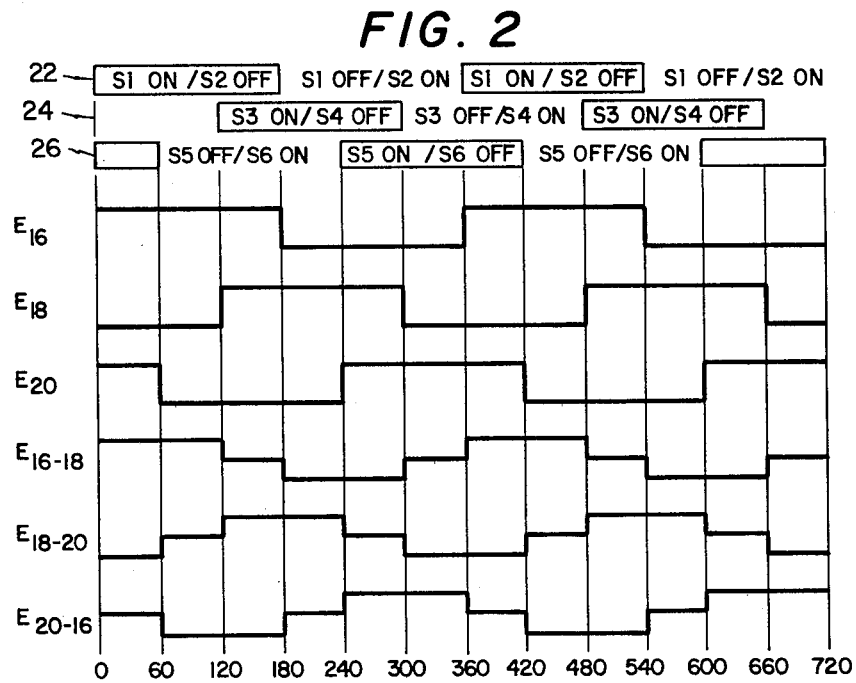
FIG. 2 illustrates the input and output waveforms for the circuit of FIG. 1 with no delay.

Now referring to FIG. 2, there is shown a sequence of waveforms corresponding to the operation of the bridge circuit 10 of FIG. 1. The ordinate axis indicates the phase relationship of the various waveforms and the abscissa axis indicates level. It should be understood that the waveforms shown in FIG. 2 are for ideal switches, that is, each switch of the complimentary pairs $S_1$–$S_2$, $S_3$–$S_4$ and $S_5$–$S_6$ instantaneously turns off prior to the remaining, or complimentary, switch in the pair turning on.

The operation of the switch is illustrated by the labels on lines 22, 24 and 26. Line 22 corresponds to the operation of switches $S_1$ and $S_2$, line 24 corresponds to the operation of the switches $S_3$ and $S_4$ and line 26 corresponds to the operation of the switches $S_5$ and $S_6$. For example, when $S_1$ is on, $S_2$ is off and in like manner, when $S_2$ is on, $S_1$ is off. The boxes on line 22 illustrate what condition the switches are in with respect to the ordinate axis which is divided into 60° increments. The waveforms illustrated in FIG. 2 are synchronized, that is, the frequency and phase of each waveform is constant relative to each other.

A waveform $E_{16}$ represents the voltage on the output terminal 16. When $S_1$ is on and $S_2$ is off, the voltage on the output terminal 16 is $+E_{DC}$ and when $S_2$ is on and $S_1$ is off the voltage on the output terminal 16 is $-E_{DC}$. For clarity purposes, $+E_{DC}$ is referred to as "high" and $-E_{DC}$ is referred to as "low." Switch $S_1$ is on for 180° and switch $S_2$ is on for 180° for a total of 360°.

A waveform $E_{18}$ represents the voltage on the output terminal 18. Referring to the labels in line 24 and the waveform $E_{18}$, it can be seen that switch $S_3$ turns on and $S_4$ turns off at a phase of 120°. When $S_3$ turns off, $S_4$ turns on at phase of 300°. $S_3$ is on for 180° and $S_4$ is on for 180° for a total of 360°. The waveform $E_{18}$ is shifted in phase from the waveform $E_{16}$ by 120°.

A waveform $E_{20}$ represents the voltage on the output terminal 20. Referring to the labels in line 26 and the wavefom $E_{20}$, it can be seen that $S_5$ turns on and $S_6$ turns off at a phase of 240°. $S_6$ turns on at a phase of 420° and $S_5$ turns off. $S_5$ is on for 180° and $S_6$ is on for 180° for a total of 360°. The waveform $E_{20}$ is shifted from the waveform $E_{16}$ by 240°.

A waveform $E_{16\text{-}18}$ represents the voltage taken across the output terminals 16 and 18 with the output terminal 16 established as the positive reference terminal. From 0° to 120° phase shift, switch $S_1$ is on, thereby applying a positive voltage on the output terminal 16 and $S_4$ is off, thereby applying a negative voltage on the output terminal 18 for an effective positive voltage between the terminals 16 to 18. From 120° to 180°, switch $S_1$ remains on, thereby applying a positive voltage on the output terminal 16 and $S_3$ is also on, thereby applying a positive voltage on the output terminal 18 for a resultant 0 volts across the terminals 16 to 18. From 180° to 300°, $S_2$ is closed, thereby applying a negative voltage on the output terminal 16 and $S_3$ is closed, thereby applying a positive voltage on the output terminal 18. Since the output terminal 16 is the positive reference voltage, the voltage from the output terminal 16 to the output terminal 18 is a negative voltage or it is low. From 300° to 360° the switch $S_2$ is closed, thereby applying a negative voltage on the output terminal 16 and $S_4$ is closed, thereby applying a negative voltage on the output terminal 18 resulting in a 0 voltage difference between the output terminals 16 and 18. From 360° on, the waveform begins to repeat itself.

A waveform $E_{18\text{-}20}$ represents the voltage between the output terminal 18 and the output terminal 20 with the output terminal 18 established as the positive reference terminal. The waveform $E_{18\text{-}20}$ is similar to the waveform $E_{16\text{-}18}$ except that it is shifted in phase by 120° from the waveform $E_{16\text{-}18}$.

A waveform $E_{20\text{-}16}$ represents the voltage between the output terminal 20 and the output terminal 16 with the output terminal 20 established as the positive reference terminal. The waveform $E_{20\text{-}16}$ is similar to both the waveform $E_{16\text{-}18}$ and the waveform $E_{18\text{-}20}$ except that it is shifted in phase by 240° from the waveform $E_{16\text{-}18}$ and 120° from the waveform $E_{18\text{-}20}$.

The waveforms $E_{16\text{-}18}$, $E_{18\text{-}20}$ and $E_{20\text{-}16}$ are termed pseudo-square waves. For a resistor load, the output looks like a six step square wave. However, when a motor is utilized as the load, the waveforms are integrated and appear as a sinewave to the motor. A square wave by itself will cause the motor to fail whereas a six step pseudo-square wave is sufficient to drive a motor.

Figure 3:
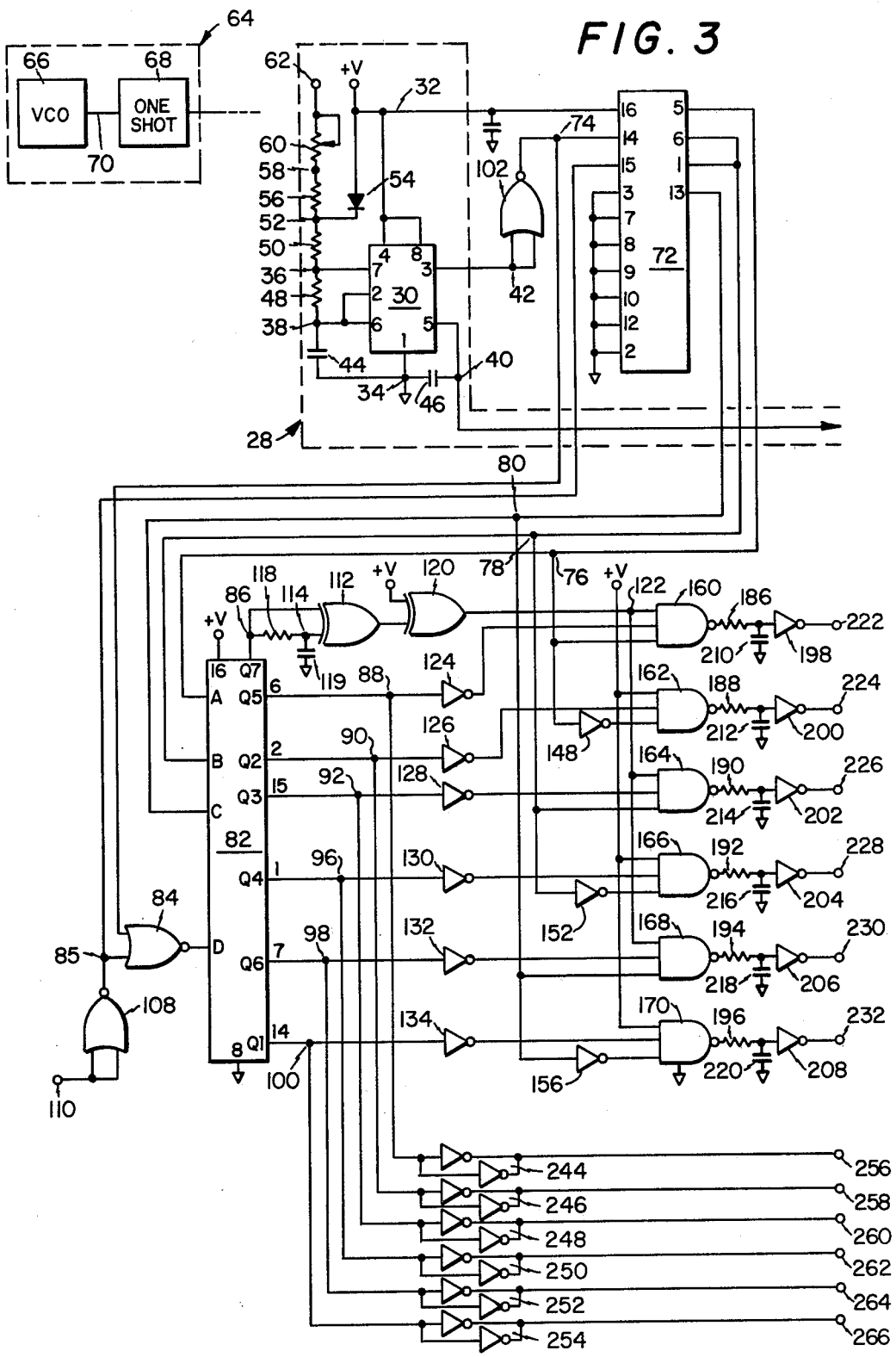
FIG. 3 is a schematic representation of a delay circuit.

Referring now to FIG. 3, there is shown a schematic representation of the steering circuit of the present invention. An asymmetrical oscillator 28 is shown within the dashed lines in FIG. 3. An Integrated Circuit 30 (IC) has pin 8 and pin 4 thereof connected to a positive terminal 32 and pin 1 thereof connected to a ground terminal 34. Hereinafter, all positive voltages are referred to the terminal 32 and all ground connections are referred to the ground terminal 34. The positive terminal 32 is connected to $+V$ and the ground terminal 34 is connected to a ground symbol.

Pin 7 of the IC 30 is connected to a node 36 and pins 6 and 2 thereof are connected to a node 38. Pin 5 of the IC 30 is connected to a node 40 and pin three thereof is connected to a node 42.

A capacitor 44 has one end thereof connected to the node 38 and the other end thereof connected to the ground terminal 34. A capacitor 46 has one end thereof connected to the node 40 and the other end thereof connected to the ground terminal 34. A resistor 48 has one end thereof connected to the node 38 and the other end thereof connected to the node 36. A resistor 50 has one end thereof connected to the node 36 and the other end thereof connected to a node 52. A diode 54 has the anode thereof connected to the positive terminal 32 and the cathode thereof connected to the node 52. A resistor 56 has one end thereof connected to the node 52 and the other end thereof connected to a node 58. A potentiometer 60 has one end thereof connected to the node 58 and the other end thereof connected to a terminal 62. The wiper of the potentiometer 60 is connected to the terminal 62 such that the potentiometer 60 is a variable resistor.

The IC 30 is a timer circuit of the type MC1455 manufactured by Motorola Products, Inc. and is connected in an astable configuration. The output of the IC 30 is on pin 3 and it is an asymmetrical square waveform having a period $t_1$ and $t_2$. The period $t_1$ has a length determined by the resistors 48 and 50 in combination with the capacitor 44. The period $t_2$ has a length determined by the resistor 48 in combination with the capacitor 44. In an exemplary embodiment of the circuit of FIG. 3, the resistor 48 is approximately 4K ohms and the resistor 50 is approximately 620K ohms. From these values, it can be seen that the period $t_2$ is much less than the period $t_1$. Therefore, the output on pin 3 of the IC 30 appears to be a sequence of negative going pulses with a very narrow pulse width, the pulse width being the length of the period $t_2$.

The frequency of the negative going pulses can be controlled by a control voltage applied to the node 40 which is connected to pin 5 of the IC 30. Pin 5 is a control voltage input for the timer and provides modulation of the frequency. In addition, a voltage on the terminal 62 can affect the amount of current that flows through the diode 54 to the resistor 50. By varying the voltage on the terminal 62, the period $t_1$ can be altered, therefore changing the overall frequency of the IC 30. It should be understood that this does not affect the period $t_2$ since during this period pin 7 is connected to ground.

In an alternate embodiment of the present invention, a circuit 64 can be substituted for the circuit 28. The circuit 64 is comprised of a VCO 66 and a one-shot 68. The VCO 66 outputs a constant frequency on a control line 70 to drive the one-shot 68. The one-shot can be triggered on either the leading or trailing edge of the VCO 66 waveform. The output of the one-shot 68 is selected such that the output is a negative going pulse. The time between the pulses is determined by the period of the VCO 66 and the pulse width is determined by the timing components (not shown) on the one-shot 68. The VCO 66 can utilize an MC1455 and the one-shot 68 can utilize an MC14538 both manufactured by Motorola Semiconductor Products, Inc. The output of the one-shot 68 is connected to the node 42 in place of the circuit 28. It should be understood that the operation of the circuit 64 is similar to that of the circuit 28 with slight variations, as described above.

A divide-by-N integrated circuit 72 is configured such that it divides an input frequency by a factor of six. The divider 72 has pin 14 thereof connected to a node 74, pin 5 thereof connected to a node 76, pin 1 and pin 6 thereof connected to a node 78 and pin 13 thereof connected to a node 80. Pins 3, 7, 8, 9, 10, 12 and 2 of the IC 72 are connected to the ground terminal 34 and pin 16 thereof is connected to the positive terminal 32. The output waveforms on the nodes 76, 78 and 80 are square waves that are 120° out of phase as will be described below. The IC 72 is an MC14018 manufactured by Motorola Semiconductors, Inc.

A 4-16 decoder IC 82 receives a four bit binary word and decodes it to activate one of 10 outputs. The input binary word is input to the A, B, C and D inputs of the IC 82 and one of the outputs Q0-Q9 thereof is activated.

The decoder IC 82 has the A input thereof connected to the node 76, the B input thereof connected to the node 78 and the C input thereof connected to the node 80. The D input of the decoder 82 is connected to the output of a NOR gate 84. The A input of the decoder 82 is the lowest order bit in the input binary word and the D input thereof is the highest order bit. The NOR gate 84 has one input thereof connected to the node 74 and the other input thereof connected to a node 85.

The decoder 82 has the Q7 output thereof connected to a node 86, the Q5 output thereof connected to a node 88, the Q2 output thereof connected to a node 90, the Q3 output thereof connected to a node 92, the Q4 output thereof connected to a node 96, the Q6 output thereof connected to a node 98 and the Q1 output thereof connected to a node 100. Pin 16 of the IC 82 is connected to the positive terminal 32 and pin 8 thereof is connected to the ground terminal 34. The IC 82 is an MC14028 manufactured by Motorola Semiconductors, Inc.

A NOR gate 102 has both inputs thereof connected to the node 42 and the output thereof connected to the node 74. The NOR gate 102 is configured as an inverter. A NOR gate 108 has both inputs thereof connected to a terminal 110 and the output thereof connected to the node 85.

An exclusive OR gate 112 has one input thereof connected to the node 86 and the other input thereof connected to a node 114. A resistor 118 has one end thereof connected to the node 86 and the other end thereof connected to the node 114. A capacitor 119 has one end thereof connected to the node 114 and the other end thereof connected to the ground terminal 134. An exclusive OR gate 120 has one input thereof connected to the output of the exclusive OR gate 112, the other input thereof connected to the positive terminal 32 and the output thereof connected to a node 122.

When the voltage on the node 86 changes potential from a low state to a high state, one input of the exclusive OR gate 112 instantaneously increases to the high state while the other input thereof that is connected to the node 114 is delayed by the combination of the resistor 118 and the capacitor 119. Since an exclusive OR gate only changes states on the output when there are differing states on the inputs, the difference between the states on the node 86 and 114 causes the exclusive OR gate 112 to change states on the output for a duration equal to the delay provided by the resistor 118 and the capacitor 119. This delay is approximately 100 microseconds in the present circuit and provides a 100 microsecond pulse on the input to the exclusive OR gate 120. Since one input of the exclusive OR gate 120 is connected to the positive terminal 32, the output thereof is in the high state until the state on the other input thereof changes from low to high. Therefore, the signal on the node 122 changes from a high state to a low state whenever the signal on the node 86 changes from a low to a high state. It should be understood that the signal on the node 122 is in a low state only for the delay period provided by the resistor 118 and the capacitor 119.

A series of an invertors 124, 126, 130, 132 and 134 have the inputs thereof connected to the nodes 88-100 respectively. The inverters 124-134 invert the outputs of the IC 82 on the nodes 88-100 respectively.

A series of inverters 148, 152 and 156 have the inputs thereof connected to the node 76, 78 and 80, respectively. The inverters 148, 152 and 156 invert the waveforms that are output by the divider 72 to provide the complements thereof.

A series of three input NAND gates 160, 162, 164, 166, 168 and 170 have the second inputs thereof connected to the output of the inverters 124–134, respectively. The first input of each of the three input NAND gates 160, 164 and 168 is connected to the node 122. The first input of each of the three input NAND gates 162, 166 and 170 is connected to the positive terminal 32. The three input NAND gate 160 has the third input thereof connected to the node 76. The three input NAND gate 162 has the third input thereof connected to the output of the inverter 148. The three input NAND gate 164 has the third input thereof connected to the node 78. The three input NAND gate 166 has the third input thereof connected to the output of the inverter 152. The three input NAND gate 168 has the third input thereof connected to the node 80. The three input NAND gate 170 has the third input thereof connected to the output of the inverter 156.

A series of resistors 186, 188, 190, 192, 194 and 196 each have one end thereof connected to the outputs of the three input NAND gates 160-170 respectively. A series of inverters 198, 200, 202, 204, 206 and 208 have the inputs thereof connected to the other end of the resistors 186-196, respectively. A series of capacitors 210, 212, 214, 216, 218 and 220 each have one end thereof connected to the input of the inverters 198–208, respectively and the other end thereof connected to the ground terminal 34. The outputs of the inverters 198-208 are each connected to an output terminal 222, 224, 226, 228, 230 and 232, respectively. The combination of each of the resistors 186–196, respectively and each of the capacitors 210-220, respectively form a low pass filter and provide a small delay between the outputs of the three input NAND gates 160–170 and the inverters 198–208, respectively.

A series of parallel connected inverter pairs 244, 246, 248, 250, 252 and 256 have the inputs thereof connected to the nodes 88–100, respectively and each of the outputs thereof connected to output terminals 256, 258, 260, 262, 264 and 266, respectively. Each of the inverter pairs 244–252 comprises two inverters having the inputs thereof connected together and the outputs thereof connected together to provide a higher output driving capability.

Figure 4:
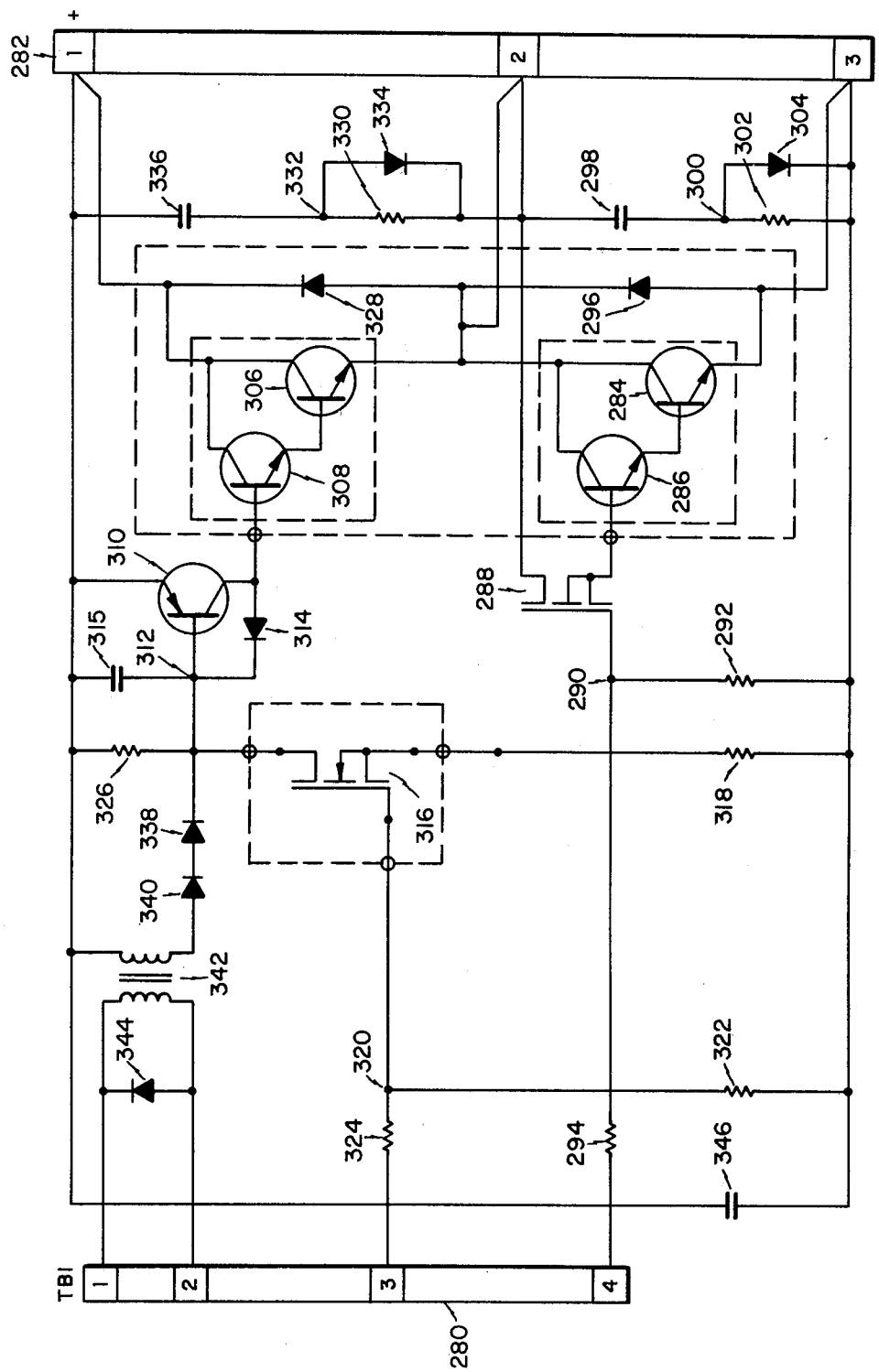
FIG. 4 is a schematic representation of a driving circuit.

Referring now to FIG. 4, there is shown a schematic diagram of one of the pairs of complimentary switches of FIG. 1 wherein like numerals refer to like parts in the various figures. An input terminal board 280 provides an interface with the circuit of FIG. 3 and an output terminal board 282 provides an output interface. An NPN transistor 284 has the emitter thereof connected to pin 3 of the terminal board 282 and the collector thereof connected to pin 2 of the terminal board 282. A PNP transistor 286 has the emitter thereof connected to the base of the transistor 284 and the collector thereof connected to pin 2 of the terminal board 282. The transistors 284 and 286 are arranged in a Darlington configuration.

An N-channel FET 288 has the source thereof connected to the base of the transistor 286, the drain thereof connected to terminal 2 of the terminal board 282 and the gate thereof connected to a node 290. A resistor 292 has one end thereof connected to the node 92 and the other end thereof connected to terminal 3 of the terminal board 282. A resistor 294 has one end thereof connected to pin 4 of the terminal board 280 and the other end thereof connected to the node 290. The FET 288 provides base drive for the Darlington transistor pair consisting of transistors 284 and 286, therefore providing a switch between terminals 2 and 3 of the terminal board 282.

A diode 296 has the anode thereof connected to terminal 3 of the terminal board 282 and the cathode thereof connected to terminal 2 of the terminal board 282. A capacitor 298 has one end thereof connected to terminal two of the terminal board 282 and the other end thereof connected to a node 300. A resistor 302 has one end thereof connected to the node 300 and the other end thereof connected to terminal 3 of the terminal board 282. A diode 304 has the anode thereof connected to the node 300 and the cathode thereof connected to terminal 3 of the terminal board 282. The diodes 296 and 304, the capacitor 298 and the resistor 302 provide suppression for switching transients between terminals 2 and 3 of the terminal board 282.

An NPN transistor 306 has the emitter thereof connected to terminal 2 of the terminal board 282 and the collector thereof connected to terminal 1 of the terminal board 282. An NPN transistor 308 has the emitter thereof connected to the base of the transistor 306 and the collector thereof connected to terminal 1 of the terminal board 282. A PNP transistor 310 has the emitter thereof connected to terminal 1 of the terminal board 282, the collector thereof connected to the base of the transistor 308 and the base thereof connected to a node 312. A diode 314 has the anode thereof connected to the base of the transistor 308 and the cathode thereof connected the node 312. A capacitor 315 has one end thereof connected to the node 312 and the other end thereof connected to terminal 1 of the terminal board 282. The transistors 306 and 308 are configured as a Darlington pair and the transistor 310 provides base drive for the Darlington pair. The diode 314 provides a current path to deplete the charge stored on the collector of the transistor 310.

An N-channel FET 316 has the source thereof connected to one end of a resistor 318, the drain thereof connected to the node 312 and the gate thereof connected to a node 320. The other end of the resistor 318 is connected to terminal 3 of the terminal board 282. A resistor 322 has one end thereof connected to the node 320 and the other end thereof connected to terminal 3 of the terminal board 282. A resistor 324 has one end thereof connected to the node 320 and the other end thereof connected to terminal 3 of the terminal board 280. A resistor 326 has one end thereof connected to the node 312 and the other end thereof connected to terminal 1 of the terminal board 282. The FET 316 provides base drive for the transistor 310. It should be understood that a P-channel FET can replace the FET 316 and the transistor 310 such that the Darlington pair of transistors 306 and 308 could be driven from the terminal 1 of the terminal board 282.

A diode 328 has the anode thereof connected to terminal 2 of the terminal board 282 and the cathode thereof connected to terminal 1 of the terminal board 282. A resistor 330 has one end thereof connected to terminal 2 of the terminal board 282 and the other end thereof connected to a node 332. A diode 334 has the anode thereof connected to the node 332 and the cathode thereof connected to terminal 2 of the terminal board 282. A capacitor 336 has one end thereof connected to the node 332 and the other end thereof connected to terminal 1 of the terminal board 282. The diodes 328 and 334, the resistor 330 and the capacitor 336 suppress switching transients across terminals 1 and 2 of the terminal board 282.

A diode 338 has the cathode thereof connected to the node 312 and the anode thereof connected to the cathode of a diode 340. The anode of the diode 340 is connected to one end of the secondary winding of the pulse transformer 342. The other end of the secondary winding of the transformer 342 is connected to terminal 1 of the terminal board 282. The primary winding of the transformer 342 is connected across terminals 1 and 2 of the terminal board 280. A diode 344 has the anode thereof connected to terminal 2 of the terminal board 280 and the cathode thereof connected to terminal 1 of the terminal board 280. An input pulse across terminals 1 and 2 of the terminal board 280 provides a signal on the secondary winding of the pulse transformer 342 that aids in drawing charge out of the base of the transistor 310. As will be described below, this aids in turning off the transistor 310.

A bypass capacitor 346 has one end thereof connected to terminal 1 of the terminal board 282 and the other end thereof connected to terminal 3 of the terminal board 282. The capacitor 346 is a bypass capacitor to reduce transients between terminals 1 and 3 of the terminal board 282. It should be understood that the transistor 306 comprises the switches $S_1$, $S_3$ and $S_5$ and the transistor 284 comprises the switches $S_2$, $S_4$, and $S_6$ of FIG. 1. Also, terminal 3 of the terminal board 282 is connected to $-E_{DC}$, terminal 1 thereof is connected to $+E_{DC}$ and terminal 2 thereof is connected to one of the output terminal 16, 18 or 20 of the bridge circuit 10 of FIG. 1.

Figure 5:
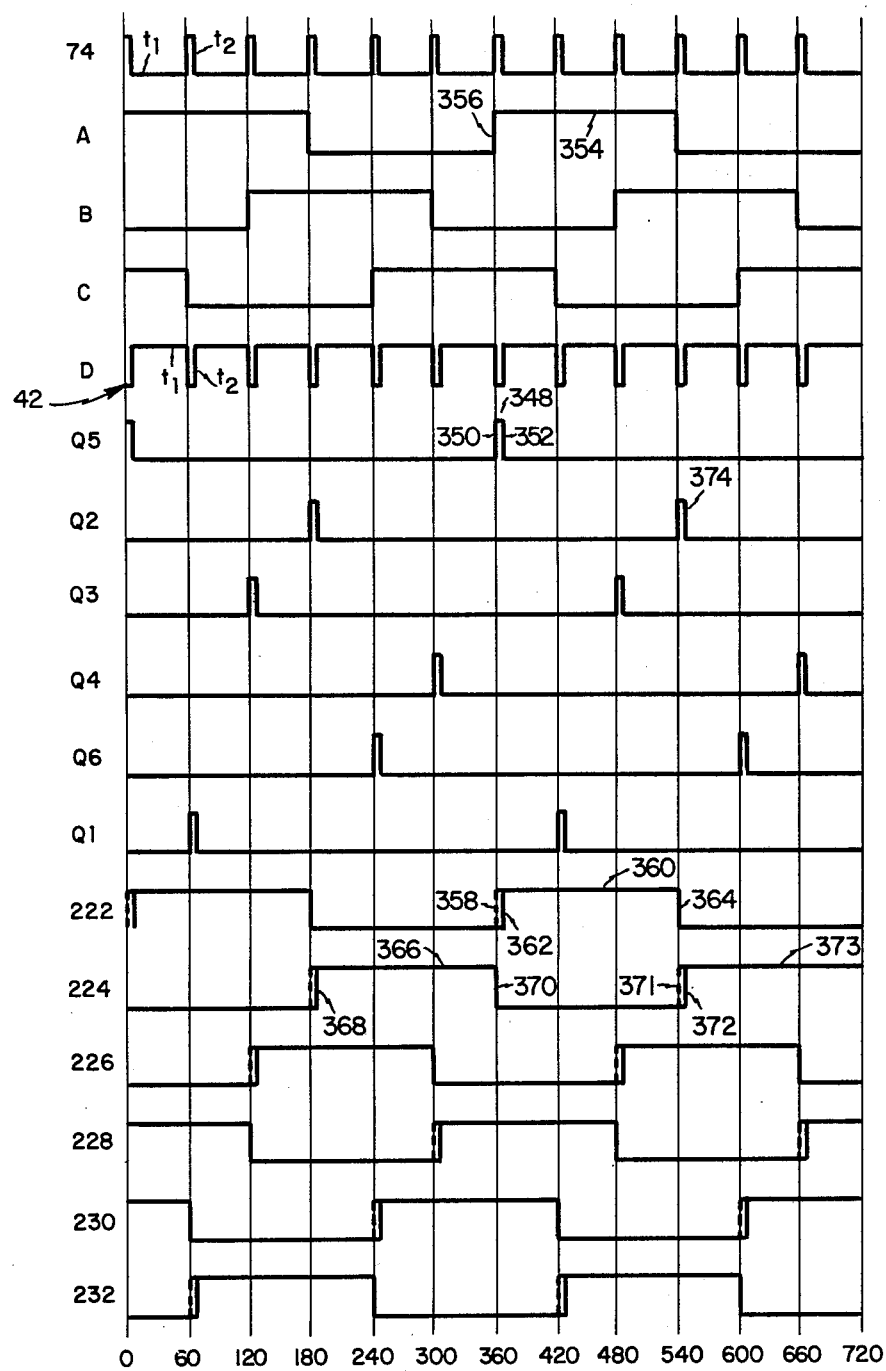
FIG. 5 illustrates the waveforms for the circuit of FIG. 3.

Referring now to FIG. 5, there is shown a series of waveforms that represent the various operations of the circuitry shown in FIG. 3. Referring also to FIG. 3, the operation of the circuit will be described in conjunction with the waveforms of FIG. 5. The outputs of the clock circuits 28 or 64 is represented by the waveform 42 that occurs on the node 42. The waveform 42 is a series of negative going pulses recurring at a frequency in the audio range with a negative going pulse width of approximately 28 microseconds. The $t_1$ period is labeled and the $t_2$ period is labeled to correspond to the time constants of the IC 30 of FIG. 3, as described above. For clarity purposes, the width of $t_2$ is exaggerated.

The waveform labeled 74 is the inverse of the waveform 42 that occurs on the node 74. The waveform labeled A is the input waveform to the A terminal of the IC 82 on the node 76. The waveform labeled B is the input waveform to the B terminal of the IC 82 on the node 78. The waveform labeled C is the input waveform to the C terminal of the IC 82 on the node 80. The waveform labeled D is the input waveform to the D terminal of the IC 82. It should be understood that the waveform D is the inverse of the waveform 74 since the waveform 74 is input to the NOR gate 84. The waveforms A, B and C are the output waveforms from the IC 72 and are square waves that are shifted in phase by 120° and are divided by a factor of 6 from the frequency of the waveform 74. Since the IC utilized for the IC 72 is edge triggered the width of the pulse $t_1$ is not relevant, that is, only the occurrence of a positive or negative going edge is relevant.

The output of the decoder 82 is represented by the waveforms $Q_5$, $Q_2$, $Q_3$, $Q_4$, $Q_6$ and $Q_1$ that are output to the nodes 88–100 respectively. These waveforms are derived by utilizing a truth table for a 4-16 decoder IC such as an MC14028 manufactured by Motorola Semiconductor, Inc. This truth table can be found on page 5-81 of the Volume 5/Series B Motorola Data Book (1976). It should be noted that the absence of a negative going pulse on the D input of the decoder 82 results in no pulse output from the terminals Q1–Q6 thereof.

The waveforms $Q_5$ and $Q_2$ in combination with the waveform A are processed to provide the switching logic for the switches $S_1$ and $S_2$ of FIG. 1. The waveform $Q_5$ is input to the inverter 124 to provide the inverted waveform of $Q_5$ on the node 126 that is input to the third input of the NAND gate 160. The second input of the NAND gate 160 receives the waveform A on the node 76. The first input of the NAND gate 160 is normally in the high state during operation. The output of the NAND gate 160 is then inverted by the inverter 220 to provide an overall AND function. For clarity purposes, the delay provided by the combination of the resistors 186–196 and the capacitors 210–220 is assumed to be negligible.

The waveform labeled 222 represents the waveform output on the terminal 222. Waveform 222 is the AND function of the waveform A and the complement of the waveform $Q_5$. It should be noted that the waveform output by the inverter 124 is high until a positive going pulse occurs on waveform $Q_5$. Therefore, the pulse on the waveform $Q_5$ effectively blanks a portion of the waveform A. For example, an individual pulse 348 that occurs at 360° phase shift has a leading edge 350 and a trailing edge 352. The time between the leading edge 350 and the trailing edge 352 is equal to the time constant $t_2$. A pulse 354 on the waveform A has a leading edge 356 that also occurs at a 360° phase shift. The leading edge 356 and the leading edge 350 are synchronized such that they occur at the 360° phase shift. For the duration of the pulse 348, the waveform A is blanked. This is illustrated in the waveform 222 by a dotted line 358 on a pulse 360. If the pulse 348 did not occur in the waveform $Q_5$, the dotted line 358 would be the leading edge of the pulse 360. It should be understood that by adjusting the time between the leading edge 350 and the trailing edge 352 of the pulse 348 the leading edge delay of the pulse 360 can be adjusted. Since the pulse width of the pulse 348 directly corresponds to the period $t_2$, an adjustment of the period $t_2$ results in an adjustment of the pulse width of the pulse 348.

The waveform labeled 224 corresponds to the waveform on the terminal 226. The three input NAND gate 162 receives the inverse of the waveform $Q_2$ on the third input thereof and the inverse of the waveform A on the second input thereof. As described above, the inverter 200 in conjunction with the NAND gate 162 provides an overall AND function. The ANDing of the complement of the waveform A and the complement of the waveform $Q_2$ results in the waveform 224. The leading edge of each of the pulses in the waveform $Q_2$ directly corresponds to the trailing edge of each of the pulses in the waveform A or the leding edge of the complement of the waveform A. As described above, this results in a blanking of the complement of the waveform A, or a leading edge delay as shown by a dotted line on the leading edges of each of the pulses in the waveform 224.

The waveform 226, 228, 230 and 232 represent the waveforms on the terminals 226, 228 and 232 respectively. Waveform 226 is the AND function of the waveform B and the complement of the waveform $Q_3$. The waveform 228 is the AND function of the complement of the waveform B and the complement of the waveform $Q_4$. The waveform 230 is the AND function of the waveform C and the complement of the waveform $Q_6$. The waveform 242 is the AND function of the complement of the waveform C and the complement of the waveform $Q_1$.

The IC 108 provides a RUN/STOP capability for the circuit of FIG. 3. A signal having either a high state or a low state is input to the terminal 110. The high state corresponds to the RUN command and the low state corresponds to the STOP command. When terminal 110 is high, the node 85 is low. The IC 84 is therefore controlled by the signal on the node 74. When the signal on the terminal 110 is low, the node 85 is high. This in turn drives the output of the IC 84 low to provide a low state on the D input of the IC 82.

When the D input on the IC 82 is in a low state, pin 15 of the IC 72 is in a high state due to the signal on the node 85. This provides a RESET input to the IC 72 that drives all of the outputs thereof high. This results in a high state on the nodes 76, 78 and 80 and input to the A, B and C inputs of the IC 82. This causes the output Q7 on the IC 82 to be in a high state.

An important aspect of the present invention is that when the signal on the terminal 110 makes the transition from low to high, or STOP to RUN, the signal on the Q7 output makes a transition from high to low. When this occurs, the first input of the exclusive OR gate 112 instantaneously goes low while the second input thereof is delayed by the resistor 118 and the capacitor 119 resulting in a negative pulse on the node 122, as described above. When the node 122 is low, the three input NAND gates 160, 164 and 168 are deactivated. This prevents a switch driven by either of the output terminals 222, 226 or 230 from closing. Since each of these terminals drives only one of the complementary switches in each of the pairs $S_1$–$S_2$, $S_3$–$S_4$ and $S_5$–$S_6$, at least one of the switches in each pair is forced off when the system is turned on. This prevents both switches in a complementary pair from inadvertently being turned on at the same time.

Referring now to FIG. 1 and FIG. 5, the functions of the waveforms 222–232 will be described in more detail. The waveform 222 provides the driving waveform for the switch $S_1$. The waveform 224, the complement of the waveform 222, drives the switch $S_2$. In like manner, the waveforms 226 and 228 drive the complementary switches $S_3$ and $S_4$, respectively. Also, waveforms 230 and 232 drive the complementary switches $S_5$ and $S_6$, respectively. When each of the above waveforms is in the high state, the respective switch is closed and when it is in the low state, the respective switch is open. As can be seen by comparing two of the complementary waveforms, for example, waveform 222 and 224, it can be seen that the leading edge of the pulses in the waveform 224 are delayed from the trailing edge of the respective pulse in the waveform 222. Therefore, switch $S_1$ is allowed a period of time to turn off prior to turning on switch $S_2$. The delay time is equal to the period $t_2$.

Referring now to FIGS. 1 through 5, the operation of the pulse transformer 342 will be described in more detail. Although six output terminals 256–266 are illustrated in FIG. 3, only three of these terminals 258, 262 and 266 are utilized with the circuit of FIG. 4. The remaining terminals are provided to illustrate that a pulse transformer can be utilized to aid in the turn off of the transistors 284 and 286. The output waveforms on the output terminals 256–266 are identical to the output waveforms $Q_1$–$Q_6$, respectively.

For simplicity, only the operation of the output terminal 256 will be described. The output terminal 222, as described above, provides the driving waveform for the switch $S_1$. In like manner, the output terminal 224 provides the driving waveform for the switch $S_2$. The driving waveforms 222 and 224 from the output terminals 222 and 224 are input to pins 3 and 4 of the terminal board 280. It should be understood that two additional circuits identical to that illustrated in FIG. 4 are provided for the complementary pairs of switches $S_3$–$S_4$ and $S_5$–$S_6$, respectively.

The pulse 360 of the waveform 222 has a leading edge 362 and a trailing edge 364 and corresponds to switch $S_1$ in the on state. A pulse 366 in the waveform 224 corresponds to the switch $S_2$ in the on state and has a leading edge 368 and a trailing edge 370. When the trailing edge of the pulse 360 occurs, the FET 316 is turned off. From a practical standpoint, the transistor 310 retains a small amount of charge on the base thereof resulting in a slow turnoff time for the transistor 310, thus keeping the switch $S_2$ in the on state. The pulse output on the terminal 254 is input to pins 1 and 2 of the terminal board 280. This pulse occurs during the delay time between a dotted line 371 and a leading edge 372 of a pulse 373. This delay time corresponds directly to a pulse 374 in the waveform $Q_2$. This pulse is coupled across the transformer 342 to aid in depleting the charge on the base of the transistor 310. Since the pulse occurs during the delay period or "dead time" of the switching circuit, it allows the leading edge delay to be smaller. It should be noted that if a bipolar transistor were used in a similar manner as the transistor 310 is used, the output pulse from the terminal 256 can be fed into a pulse transformer similar to the transformer 342 and aid in turning off the switch $S_2$.

Figure 6:
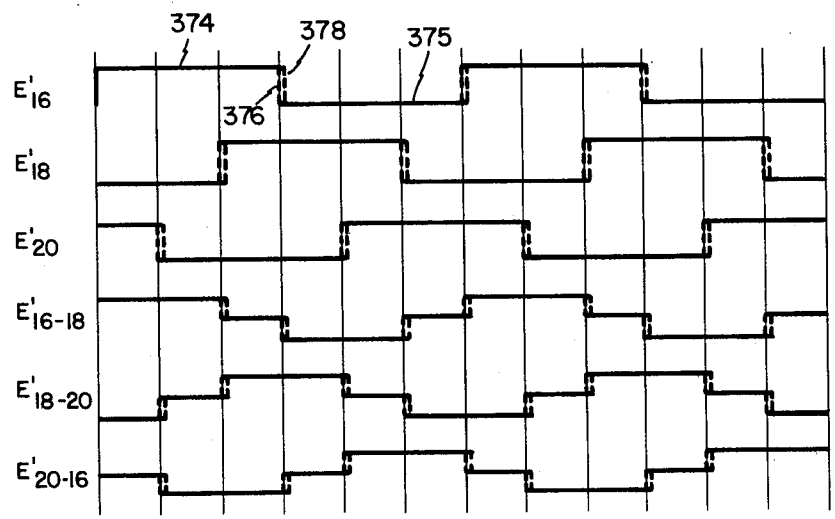
FIG. 6 illustrates the waveforms for the three phase bridge circuit of FIG. 1 utilizing the circuit of the present invention.

Referring now to FIG. 6, there is shown a series of waveforms similar to the waveforms of FIG. 2 except that the waveforms in FIG. 6 incorporate the leading edge delay circuit of FIG. 3. The switching circuit of FIG. 4 is utilized for the complementary paired switches in FIG. 1 and the voltages on each of the output terminals 16, 18 and 20 are shown in the waveforms of FIG. 6 in a similar manner to the waveforms in FIG. 2. The waveforms in FIG. 6 are labeled similar to the waveforms in FIG. 2 except that they are primed. The operation of the switches $S_1$ and $S_2$ is represented by a waveform $E'_{16}$. A line 374 represents the time that switch $S_1$ is closed and the output terminal 16 is connected to the positive terminal 12. A line 375 on the waveform $E'_{16}$ represents the period that the switch $S_2$ is closed, thereby connecting the output terminal 16 to the negative terminal 14. A dotted line 376 represents the trailing edge of the control pulse that drives the switch $S_1$ as represented by the waveform 222 of FIG. 5. A dotted line 378 represents the leading edge of the pulse that drives the switch $S_2$, as represented by the waveform 226 of FIG. 5. The period between the line 376 and the line 378 represents the dead time that allows the switch $S_1$ to turn off prior to switch $S_2$ turning on. Depending upon the switching devices utilized, the output terminal 16 may be allowed to float during this period, that is, the output terminal 16 is not connected to either terminal 12 or 14. In a similar manner, a waveform $E'_{18}$ represents the signal on the output terminal 18 and $E'_{20}$ represents the signal on the output terminal 20.

The waveforms $E'_{16}$, $E'_{18}$ and $E'_{20}$ on the output terminals 16, 18 and 20, respectively, are combined in a similar manner to that described above with reference to FIG. 2. A waveform $E'_{16-18}$ represents the voltage signal between the output terminals 16 and 18, a waveform $E'_{18-20}$ represents the signal between the output terminals 18 and 20 and a waveform $E'_{20-16}$ represents the waveform between the output terminals 20 and 16. The dotted lines in the various waveforms represent the dead time between the turning on of one switch and the turning off of the respective complementary switch. Since the pseudo-square wave signals are input to a three phase motor, the various dead times are integrated out and, since they are quite small in comparison to the overall period of the individual switching times, they are negligible.

In an important aspect of the invention, a single control that varies the delay $t_2$ in the oscillator 28 or 64 varies each of the delays in each of the switching waveforms $E'_{16}$, $E'_{18}$ and $E'_{20}$. This provides a method for controlling all switches with a uniform delay period. Since the delays are uniform, the pseudo-square waveforms $E'_{16-18}$–$E'_{20-16}$ are symmetrical.

The following table is a list of various IC's utilized in the above described circuits.

| IC ref. number | Manufacturer Part No. | Manufacturer |
| --- | --- | --- |
| 30 | MC1455 | Motorola Semiconductors, Inc. |
| 68 | MC14538 | Motorola Semiconductors, Inc. |
| 72 | MC14018 | Motorola Semiconductors, Inc. |
| 82 | MC14028 | Motorola Semiconductors, Inc. |
| 112, 120 | MC14070 | Motorola Semiconductors, Inc. |
| 84, 102, 108 | MC14001 | Motorola Semiconductors, Inc. |
| 124–134 | MC14049 | Motorola Semiconductors, Inc. |
| 148–156 | MC14049 | Motorola Semiconductors, Inc. |
| 198–208 | MC14049 | Motorola Semiconductors, Inc. |
| 244–254 | MC14049 | Motorola Semiconductors, Inc. |

In summary, the circuit of the present invention provides a method for generating a series of variable width pulses that can be "steered" to coincide with the leading edge of various switching waveforms. The pulses delay the leading edge of each of the switching waveforms such that the complementary switch that is changing states from on to off is provided an additional period of time to turn off prior to turning on the remaining switch in the complementary pair. In addition, a pulse is also output to aid in turning off a respective switch. The delay period can be adjusted by one control thereby allowing for devices with different characteristics.

Although the preferred embodiment of the invention has been described in detail it should be understood that various changes, substitutions and alterations can be made therein without departing from the spirit and scope of the invention as defined by the appended claims.

We claim:

1. A circuit for leading edge delay in synchronized switching waveforms, comprising:
   a first power terminal;
   a second power terminal
   a plurality of output terminals;
   a plurality of complementary paired switches, each of said pairs associated with one of said output terminals and having a first and second switch, the first and second switch of each of said paired switches alternately connecting said first and second power terminals to the associated one of said output terminals;
   means for generating a plurality of synchronized reference pulse waveforms and the complements thereof, each of said reference waveforms and the complements thereof associated with each of said paired switches for switching thereof;
   means for generating a delay pulse having a variable width;
   steering means for receiving said reference waveforms and said delay pulse and generating a blanking pulse waveform for each of said reference waveforms and the complement waveforms thereof, each pulse therein having a width equal to the width of said delay pulse, the leading edge of each of the pulses in each of said blanking waveforms directly corresponding to the leading edge in the corresponding pulse of said reference waveforms and said complement waveforms;
   blanking means for receiving said reference waveforms, said complement waveforms and said blanking waveforms, said blanking means outputting a plurality of corresponding delayed pulse waveforms, each pulse therein having the trailing edge thereof directly corresponding to the trailing edge of each of the pulses in each of the corresponding one of said reference waveforms and said complements thereof and the leading edges thereof delayed by the width of said delay pulse, each of said delayed waveforms for driving each of the first and second switches of each of said paired switches wherein closing of the first or second switch in each of said paired switches is delayed to allow the complementary switch thereof sufficient time to open; and
   an inhibit circuit for generating an inhibit signal to inhibit said blanking means from generating said delayed waveforms corresponding to said complementary waveforms.

2. The circuit of claim 1 wherein both the first and second switch of each of said paired switches comprise a pair of NPN transistors connecting in a Darlington configuration.

3. The circuit of claim 1 wherein said means for generating said reference waveforms and the complement thereof comprises:
   an oscillator having a constant frequency;
   a frequency divider for dividing the frequency of said oscillator, said frequency divider outputting the plurality of said reference waveforms; and
   a plurality of inverters, the input of each of the inverters for receiving one of said reference waveforms and each of the outputs thereof for outputting said complement waveforms.

4. The circuit of claim 1 wherein said means for generating a delay pulse comprises a monostable multivibrator having a variable pulse width.

5. The circuit of claim 1 wherein said blanking means comprises a plurality of AND gate logic circuits each having at least two inputs, one of said inputs for receiving one of said reference waveforms and the complements thereof and the other of said inputs for receiving one of said blanking waveforms such that each of the pulses in each of said blanking waveforms inhibits the output of the respective one of said AND gates at the leading edge of each of the pulses of the respective one of said first waveforms and the complements thereof and for a duration equal to the width of said delay pulse.

6. A circuit for delaying the leading edge of synchronized switching waveforms for a three-phase DC to AC converter, comprising:
  a first power terminal;
  a second power terminal;
  a first switching circuit having complementary first and second switches for alternately connecting said first and second power terminals to a first output terminal;
  a second switching circuit having complementary first and second switches for alternately connecting said first and second power terminals to a second output terminal;
  a third switching circuit having complementary first and second switches for alternately connecting said first and second power terminals to a third output terminal;
  means for synchronously generating a first reference pulse waveform having a 0° phase shift, a second reference pulse waveform having a 120° phase shift and a third reference pulse waveform having a 240° phase shift;
  means for receiving said first, second and third reference waveforms and generating corresponding first, second and third complementary waveforms respectively;
  means for generating a delay pulse that is synchronized with said first, second and third reference waveforms and having a variable width;
  steering means for receiving said first, second and third reference waveforms and said delay pulse and generating a separate blanking pulse for each pulse in said first, second and third reference waveforms and said first, second and third complementary waveforms, each of said blanking pulses having the leading edge thereof corresponding to the leading edge of the respective pulse of both said first, second and third reference waveforms and said first, second and third complementary waveforms and a pulse width equal to the pulse width of said delay pulse;
  blanking means fo receiving said first, second and third reference waveforms, said first, second and third complementary waveforms and said blanking pulses, said blanking means outputting delayed first, second and third reference waveforms and delayed first, second and third complementary waveforms to drive said first, second and third switching circuits, respectively, wherein said blanking pulse delays the leanding edge of each of the pulses in said first, second and third reference waveforms and said first, second and third complementary waveforms such that the opening of the first and second switch of each of said switching circuits is delayed to allow the complementary switch thereof sufficient time to close; and
  an inhibit circuit that generates an inhibit signal to inhibit said complementary delayed waveforms..

7. The circuit of claim 6 wherein the first and second complementary switches of said first, second and third switching circuits each comprise a pair of NPN transistors connected in a Darlington configuration.

8. The circuit of claim 6 wherein said means for synchronously generating comprises:
  an oscillator having a constant frequency; and
  a divide-by-six frequency divider for dividing the frequency of said oscillator, said frequency divider outputting said first, second and third reference waveforms.

9. The circuit of claim 6 wherein said means for generating said first, second and third complementary waveforms comprises an inverting logic circuit.

10. The circuit of claim 7 wherein said means for generating said delay pulse comprises a monstable multivibrator having a trigger input connected to the output of said oscillator, the pulse width thereof variable.

11. The circuit of claim 6 wherein said means for generating said delay pulse comprises a monostable multivibrator having a trigger input for receiving a trigger signal from said means for synchronously generating, the pulse width thereof variable.

12. The circuit of claim 6 wherein said steering means comprises a four to sixteen decoder having an A, B and C input for receiving said first, second and third reference waveforms and a D input thereof for receiving said delay pulse, said four to sixteen decoder outputting a pulse for both the leading edge and the trailing edge of each pulse in each of said reference waveforms to produce said blanking pulses.

13. The circuit of claim 6 wherein said blanking means comprises a plurality of AND logic circuits each having at least two inputs for receiving each of said reference waveforms and the complements thereof and each of the pulses in each of said blanking waveforms.

* * * * *